United States Patent Office 2,827,443
Patented Mar. 18, 1958

2,827,443
PROCESS FOR PRODUCING HALOETHYLENIC POLYMERS HAVING ENHANCED DYE RECEPTIVITY

Marion R. Rector and Harold G. Hahn, Midland, Mich., assignors to The Dow Chemical Company, Midland, Mich., a corporation of Delaware No Drawing. Application March 16, 1956
Serial No. 571,888

14 Claims. (Cl. 260—85.5)

This invention relates to a novel process for producing interpolymers having enhanced dye receptivity and prepared from haloethylenic monomers with comonomers having basic functional groups. More particularly it relates to such a process employing simple polymerization procedures, and to the product thereby obtained.

The polymers and copolymers of haloethylenic monomers such as vinylidene chloride either with or without another copolymerizable monomer such as vinyl acetate, and acrylonitrile, have been employed in a wide variety of applications. One of the serious drawbacks with such polymers and copolymers has been their very poor dye receptivity to acid dyes and poor light stability when other dyes were used, so that only pigmented compositions could be employed when colored articles were desired. That poor receptivity to acid dyes has been attributed to the hydrophobic nature of such polymers and also to their lack of suitable loci within the molecule for attaching acid dye molecules. Many varied procedures have been attempted for improving the acid dye receptivity of the polymers and copolymers of vinylidene chloride. Among those procedures may be mentioned the intimate blending of those polymers with different polymers which have suitable points of attachment for dye molecules. The disadvantages of such blending is immediately apparent. Two separate polymerization procedures are required involving added polymerization equipment and time and consequently added costs of production. Additionally a costly and time-consuming blending operation is required. When standard polymerization techniques, such as suspension polymerization, have been employed in an attempt to produce a copolymer or interpolymer of vinylidene chloride with a monomer having a basic functional group, the result has always been a low yield of a highly degraded, greatly discolored polymer which was commercially useless since the color imparted by any dye to such a film would be masked or changed to a non-reproducible shade by the initial dark color of the polymer. Additionally many such basic groups seriously retard or even inhibit polymerizations, and in those instances the polymerizations require such a long time as to be impractical.

It would be desirable to have and it is accordingly the principal object of this invention to provide a novel process for producing interpolymers of haloethylenic monomers with copolymerizable monomers having basic groups to act as loci for the attachment of acid dyes.

It is a further object to provide such a process wherein simple polymerization techniques may be employed with the expected satisfactory results.

It is a still further object to provide such a process whereby the resultant polymers are obtained in increased yield and having less degradation than has been heretofore possible.

The above and related objects are accomplished by means of a process wherein a monomeric material comprising a haloethylenic monomer and copolymerizable monomers having certain pendant basic groups is dispersed within an aqueous polymerization medium comprising catalytic quantities of an addition type polymerization catalyst, and an acid capable of neutralizing the basicity of the basic groups attached to the monomers and the so-formed dispersion subjected to conditions known to induce polymerization. By means of this process copolymers are produced in increased yield and having enhanced dye receptivity.

The process contemplates the preparation of binaries wherein the monomeric material consists of a haloethylenic monomer and the monomer having basic functional groups and ternaries wherein the monomeric material consists of a haloethylenic monomer, a monoethylenic copolymerizable monomer, and the monomer having basic functional groups. As typical examples of haloethylenic monomers may be mentioned vinylidene chloride and vinyl chloride. It has heretofore been impossible to copolymerize vinylidene chloride with monomers having basic groups without serious degradation and the polymers of vinylidene chloride have been impossible to dye with any degree of predictability of or success. For those reasons it is preferred to employ vinylidene chloride as the haloethylenic monomer, since the new method gives readily dyeable, stable and useful copolymers.

The monoethylenic monomers copolymerizable with such haloethylenic monomers are well known in the art. As typical examples of second monomers may be mentioned vinyl chloride, vinylidene chloride, acrylonitrile, acrylic acid esters, and vinyl acetate. Such monomers are utilized to impart special properties to polymers prepared from haloethylenic monomers. The copolymers may exhibit improved fabricating qualities, increased stability to heat and light, better strength and other similar properties.

The monomers having basic groups may be selected from any monoethylenically unsaturated monomer copolymerizable with the haloethylenic monomer and which has a basic functional group which is separate or pendant from the polymerizable unsaturated portion of the monomer and which is capable of forming salts with acids. Although any monoethylenically unsaturated monomers having pendant basic functional groups may be employed in the process, the dye receptivity imparted to the polymer will vary with the nature of the group, and accordingly those monomers having the basic groups which impart the greatest dye receptivity are preferred. Among these preferred basic groups may be mentioned the amines so that a preferred class of monomers includes the vinyl pyridines and the aminated alkyl acrylates, such as N-morpholino ethyl acrylate. Polymers prepared using monomers having pendant amide groups show very little increase in dye receptivity over the unmodified polymer. The monomers should not materially change the physical properties inherent in the unmodified polymer when used in the amounts set forth in this application.

Although polymerization may be achieved by means of this process using the above described monomers in any and all proportions so that consequently there are no limits imposed on the process because of the polymerization kinetics or mechanism, there nevertheless are limits imposed by certain practical considerations. It is known that the chemical and physical properties, qualities, and characteristics of any polymer are dependent almost exclusively upon the empirical structure of that polymer and are thus dependent to a large degree upon the chemical nature of the monomers used to prepare the polymer. In the process described in this application it is desired to retain the distinctive physical properties inherent in the haloethylenic polymers and copolymers and for this reason the haloethylenic monomer and monoethylenic monomer copolymerizable therewith should be present in the preponderant amount. It has been found that such properties may be retained when the combined weight of haloethylenic monomer and the copolymerizable monoethylenic monomer comprises at least 88 percent of the monomeric material. Correspondingly up to about 12 percent of the weight of the monomeric material may consist of the monomer having basic groups. It has been found that greatly enhanced dye receptive polymers are formed when the monomer having the basic groups constitutes from 2 to 12 percent of the monomeric material and such a monomeric composition is preferred.

The acids which may be employed are those acids capable of neutralizing in situ the basicity of the basic groups pendant from the monomer. It is necessary that the acid and basic group form an oil-soluble neutralized entity since it has been found that when a monomer having a pendant amine group is added to the polymerization recipe in the form of its water-soluble acid salt, the process is not operable because the copolymerizability is altered and no enhanced dye receptivity is exhibited by any polymer which might be formed. The same monomer and acid may be added independently to form the oil-soluble entity and dye receptivity will be greatly improved. The acid should be employed in equivalent amounts to the basic groups used in the monomeric material, although a slight excess of acid may be tolerated. When less than equivalent amounts are used the unneutralized basic groups are left free to cause degradation of the haloethylenic portions of the polymer chain. As examples of operative acids may be mentioned the mineral acids such as sulfuric, nitric, and hydrochloric acids and the oil-soluble organic sulfonic acids such as methane sulfonic acid, benzene sulfonic acid, toluene sulfonic acid, and 2-naphthalene sulfonic acid. Carboxylic acids, such as acetic acid and benzoic acid, and the phenols have not been found to be operative in the process.

The process may be carried out by the conventional aqueous dispersion polymerization techniques, such as suspension polymerization systems. Such techniques are well known in the art and need only be exemplified. Typically suspension polymerization comprises the dispersion of a monomeric material in an aqueous medium comprising an oil-soluble polymerization catalyst such as lauroyl peroxide and optionally a colloidal dispersing agent capable of maintaining the droplet size. Polymerization is initiated and maintained by warming the dispersion. Most commonly, dispersion is maintained by continuous agitation. Following polymerization the polymer is isolated by filtration.

Polymers have been prepared in the past from monomers containing no halogen, such as acrylonitrile, and comonomers having certain basic groups. However, in view of the fact that haloethylene polymers could not be prepared in the presence of any basic groups without considerable degradation, it was unexpected that a process could be found for preparing the interpolymers of this invention. A further difficulty that is encountered in the interpolymerization of haloethylenic monomers and monomers having basic groups but without the addition of the acid, is th serious retardation of the rate of polymerization. In some instances the polymerizations are completely inhibited and no polymer results. When this process is used, however, with the acid, the rates of polymerization are comparable to that observed when no basic monomer is used.

There is no critical order of addition of the various components of the mixture to be polymerized according to this invention. A convenient manner of carrying out the process is to premix all monomers and add them to the aqueous medium containing the catalyst and acid. For reasons of safety it is important that the acid and the basic monomer not come into contact prior to their dispersion in the polymerization medium.

The polymers prepared by this process may be fabricated by the usual procedures, such as extrusion, molding, wet and dry spinning, and other conventional methods. Usually the fabricating procedure that is employed for the unmodified polymer is suitable and therefore preferred for the modified polymers of this invention. For example the copolymers of vinylidene chloride and vinyl chloride are well suited for extrusion methods and those methods are preferred for fabricating the modified polymer. Certain of the copolymers of vinylidene chloride and acrylonitrile are acetone soluble and capable of wet and dry spinning into fibers. Likewise, many of the modified vinylidene chloride-acrylonitrile copolymers may be spun from acetone solution.

The dye receptivity of the copolymers of this invention is particularly enhanced with respect to acid type dyes. The basic groups pendant from the polymer chain provide sites for dye acceptance. This is true even though the acid employed during polymerization neutralizes the basic groups and does not have to be removed from the polymer following polymerization. A possible explanation for the operability of this process is that a reaction occurs in situ, during polymerization between the basic group and the acid and that during dyeing the acid dye replaces the acid in such a so-formed reaction product.

The operation and advantages of this process will be more clearly understood from the following illustrative examples wherein all parts and percentages unless otherwise indicated are by weight.

EXAMPLE 1

A suspension polymerization charge was prepared by dispersing a monomeric material consisting of 48 parts of vinylidene chloride, 32 parts of acrylonitrile, and 7.9 parts of 2-methyl-5-vinyl pyridine into an aqueous medium consisting of 200 parts of water at a pH of 5.5 containing 0.4 part of lauroyl peroxide, 1 part of methyl hydroxy propyl cellulose (1500 cps. viscosity grade), and, 0.1 part lauryl mercaptan as a chain transfer agent. In this conventional procedure, no acid was used. Polymerization was initiated by warming the dispersion to 55° C. with agitation. Following polymerization for 44 hours the polymer was isolated by filtration and dried. The polymer was drak brown and insoluble in acetone. (The viscosity rating of a water soluble cellulose ether is expressed as the viscosity in centipoises of a 2 percent solution thereof in water at 20° C.)

By way of contrast when the same polymerization was repeated with the addition to the aqueous medium of various acids in accordance with the present invention, the polymers were pale yellow and soluble in acetone and were spun into fibers capable of being dyed by acid dyes. These fibers were compared with fibers prepared from a vinylidene chloride-acrylonitrile copolymer of the same proportional composition but with no pyridine and prepared in the same manner. The dye affinity or receptivity of both sets of fibers was rated according to an arbitrary scale wherein the copolymer was rated at zero, copolymers with increased dye affinity were assigned proportionate plus values up to +3 and those having dye affinity that was poorer than the copolymer were given minus values. The results are listed in Table I.

*Table 1*

| Basic Monomer | Parts | Acid | Parts | Color of Polymer | Dye Receptivity |
|---|---|---|---|---|---|
| 2-methyl-5-vinylpyridine. | 7.9 | | | pale yellow. | 0. |
| Do | 7.9 | benzene sulfonic. | 14.5 | dark brown. pale yellow. | +3. |
| N,N-diethylamino ethylacrylate. | 5.0 | | | brown. | 0. |
| Do | 5.0 | benzene sulfonic. | 8.7 | pale yellow. | +3. |
| 2-N-morpholino-ethylacrylate. | 8.0 | | | brown. | could not be spun. |
| Do | 8.0 | benzene sulfonic. | 8.0 | pale yellow. | +1. |

EXAMPLE 2

A series of polymerizations were run comprising the dispersion of 35 parts of vinylidene chloride and 5 parts of 2-vinyl pyridine into an aqueous medium consisting of 100 parts of water, 0.2 part methyl hydroxypropyl cellulose (50 cps. viscosity grade), and 0.2 part lauroyl peroxide and the subsequent warming of the dispersion to 55° C. for 42 hours with agitation. One of the samples was a blank. To the others was added prior to polymerization an amount of an acid. Following polymerization the polymers were isolated by filtration and dried. The yields are reported in Table II.

Table II

| Acid | Parts acid | Yield (percent) |
| --- | --- | --- |
| | | 0 |
| Toluene sulfonic acid | 10 | 85 |
| Benzene sulfonic acid | 5.8 | 85 |
| 2-Naphthalene sulfonic acid | 10 | 86.3 |
| Sulfuric | 7.0 | 83.7 |
| Hydrochloric | 1.7 | 82.5 |

EXAMPLE 3

Polymerizations were run by dispersing vinyl chloride and vinyl acetate in an aqueous medium consisting of 100 parts of water, 0.2 part of lauroyl peroxide, and 0.25 part of methyl hydroxypropyl cellulose (50 cps. viscosity grade). To the runs were added varying amounts of basic monomers and benzene sulfonic acid. Polymerization was initiated by warming the dispersions to 45° C. with agitation. Following polymerization for 42 hours the polymers were isolated by filtration and dried. The color of the polymer and the yields are reported in Table III.

Table III

| Parts vinyl chloride | Parts vinyl acetate | Basic Monomer | Parts Basic Monomer | Parts Acid | Color | Yield (percent) |
| --- | --- | --- | --- | --- | --- | --- |
| 35 | | 4-vinylpyridine | 5 | | yellow | 15 |
| 35 | | do | 5 | 6.8 | white | 46.3 |
| 25 | 10 | do | 2 | | | 0 |
| 32 | 10 | do | 5 | 6.8 | white | 50.5 |
| 35 | | N-morpholino ethyl acrylate | 5 | | yellow | 20 |
| 35 | | do | 5 | 6.8 | white | 72.5 |
| 25 | 10 | do | 5 | | tan | 16.3 |
| 25 | 10 | do | 5 | 6.8 | white | 47.5 |

When the runs were repeated using benzoic acid and acetic acids in place of the sulfonic acid, the yield of polymer was greatly reduced and the polymer was brown, indicating that considerable degradation had occurred.

We claim:

1. A process for preparing haloethylenic polymers having enhanced dye receptivity for acid type dyes comprising the dispersion of a monomeric material consisting of at least 88 percent by weight of a monoethylenic polymerizable material which consists predominantly of a haloethylenic monomer and of not more than 12 percent by weight of a copolymerizable monoethylenically unsaturated monomer having pendant basic functional groups into an aqueous medium comprising catalytic amounts of a polymerization catalyst and a non-carboxylic acid capable of neutralizing said basic functional groups in an amount equivalent to said basic functional groups, subjecting said dispersion to conditions known to induce polymerization of the haloethylenic monomer, and finally isolating the polymer formed.

2. The process claimed in claim 1 wherein said monoethylenic polymerizable material comprises vinylidene chloride.

3. The process claimed in claim 1 wherein said monoethylenic polymerizable material is a mixture consisting of vinylidene chloride and a copolymerizable monoethylenically unsaturated monomer.

4. The process claimed in claim 3 wherein said copolymerizable monoethylenically unsaturated monomer is acrylonitrile.

5. The process claimed in claim 1 wherein said monoethylenic polymerizable material comprises vinyl chloride.

6. The process claimed in claim 1 wherein said basic monomer is 2-vinyl pyridine.

7. The process claimed in claim 1 wherein said basic monomer is 4-vinyl pyridine.

8. The process claimed in claim 1 wherein said basic monomer is 2-methyl-5-vinyl pyridine.

9. The process claimed in claim 1 wherein said basic monomer is N,N-diethylaminoethyl acrylate.

10. The process claimed in claim 1 wherein said basic monomer is N-morpholinoethyl acrylate.

11. A copolymer of at least 88 percent by weight of a monoethylenic polymerizable material which consists predominantly of a haloethylenic monomer and not more than 12 percent by weight of a polymerizable reaction product formed from a monoethylenically unsaturated monomer having pendant basic functional groups and a non-carboxylic acid.

12. The copolymer claimed in claim 11 wherein said monoethylenic polymerizable material consists predominantly of vinylidene chloride.

13. The copolymer claimed in claim 11 wherein said monoethylenic polymerizable material consists predominantly of vinyl chloride.

14. The copolymer claimed in claim 11 wherein said reaction product is formed from vinyl pyridine and a non-carboxylic acid.

References Cited in the file of this patent

UNITED STATES PATENTS 2,636,023     Culhane et al.     Apr. 21, 1953

OTHER REFERENCES

Steiner: Abstract of S. N. 781,456, March 18, 1952 (publ. in 656 O. G. 890–1).